US012718712B2

(12) United States Patent
Merten et al.

(10) Patent No.: US 12,718,712 B2
(45) Date of Patent: Aug. 25, 2026

(54) REPOSITIONABLE NOTES MURAL PAD

(71) Applicant: 3M INNOVATIVE PROPERTIES COMPANY, St. Paul, MN (US)

(72) Inventors: Andrew J. Merten, Hastings, MN (US); Mitchell A. Giannini, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 286 days.

(21) Appl. No.: 18/564,159

(22) PCT Filed: May 20, 2022

(86) PCT No.: PCT/IB2022/054749
§ 371 (c)(1),
(2) Date: Nov. 27, 2023

(87) PCT Pub. No.: WO2022/263945
PCT Pub. Date: Dec. 22, 2022

(65) Prior Publication Data

US 2024/0249648 A1 Jul. 25, 2024

Related U.S. Application Data

(60) Provisional application No. 63/210,752, filed on Jun. 15, 2021.

(51) Int. Cl.
*G09F 7/12* (2006.01)
*B42D 5/00* (2006.01)

(52) U.S. Cl.
CPC ............... *G09F 7/12* (2013.01); *B42D 5/003* (2013.01); *G09F 2007/127* (2013.01)

(58) Field of Classification Search
CPC ................. G09F 7/12; G09F 2007/127; G09F 2003/0241; G09F 19/00; B42D 5/003
USPC ........................................................... 40/605
See application file for complete search history.

(56) References Cited

U.S. PATENT DOCUMENTS 6,557,282 B1 * 5/2003 Cleaver .................. G09F 13/04 40/605
10,994,567 B1 * 5/2021 Yambao ................ B42D 5/003
2003/0107164 A1 * 6/2003 Todie ..................... B42D 1/003 270/5.02

(Continued)

OTHER PUBLICATIONS

International Search report for PCT International Application No. PCT/IB2022/054749, mailed on Aug. 4, 2022, 4 pages.

(Continued)

*Primary Examiner* — Gary C Hoge
(74) *Attorney, Agent, or Firm* — Bryan L. Walker

(57) ABSTRACT

Methods for assembling a stack of notes for use in recreating an image. The method includes receiving an image and dividing the image into pieces. The pieces of the image are printed on adhesive-coated repositionable notes in a particular order, and the printed notes are assembled into a stack of notes in the particular order. A user can recreate the image by removing the notes from the stack of notes and placing them on a surface in the particular order, such as in rows left to right and top row to bottom row. Alternatively, the method can assign color or grayscale values to the pieces for use in recreating a version or resemblance of the image.

14 Claims, 4 Drawing Sheets

(56) References Cited

U.S. PATENT DOCUMENTS

| | | | | |
|---|---|---|---|---|
| 2005/0095384 A1* | 5/2005 | Wittmeyer, Jr. | B42D 1/009 | 428/40.1 |
| 2006/0125229 A1* | 6/2006 | Ray | B42D 1/004 | 281/15.1 |
| 2007/0062086 A1* | 3/2007 | Hamel | G09F 7/00 | 40/607.05 |
| 2011/0285123 A1* | 11/2011 | Wittke | G09F 3/10 | 283/63.1 |

OTHER PUBLICATIONS

Parabo Press Article on "How to Turn One Photo into a Square Print Grid", retrieved from internet on Jan. 22, 2024 (date unknown but believed to be prior to date of filing of the application), 9 Pages.

* cited by examiner

REPOSITIONABLE NOTES MURAL PAD

CROSS REFERENCE TO RELATED APPLICATIONS

This application is a national stage filing under 35 U.S.C. 371 of PCT/IB2022/054749, filed May 20, 2022, which claims the benefit of U.S. Provisional Application No. 63/210,752, filed Jun. 15, 2021, the disclosures of which are incorporated by reference in their entireties herein.

BACKGROUND

Murals made from repositionable paper notes are a very popular form of artwork that users create using various colored notes. However, creating a mural can be very time consuming and often results in a user purchasing many different pads of notes that are often not fully used and may go to waste. This has traditionally made repositionable notes murals very costly and time consuming to make.

SUMMARY

A first method for assembling a stack of notes for use in recreating an image includes receiving an image and dividing the image into pieces. The pieces of the image are printed on adhesive-coated repositionable notes in a particular order, and the printed notes are assembled into a stack of notes in the particular order.

A second method for assembling a stack of notes for use in recreating an image includes receiving an image, dividing the image into pieces, and assigning color or grayscale values to the pieces based upon the image. Adhesive-coated repositionable notes with the assigned color or grayscale values are selected in a particular order, and the selected notes are assembled into a stack of notes in the particular order.

For either method, a user can recreate the image by removing the notes from the stack of notes and placing them on a surface in the particular order.

A first stack of notes for use in recreating an image includes a plurality of adhesive-coated repositionable notes assembled into a stack and having pieces of the image printed on the notes. The notes are arranged in a particular order in the stack such that, when the notes are removed from the stack and placed on a surface in the particular order, the notes recreate the image.

A second stack of notes for use in recreating an image includes a plurality of adhesive-coated repositionable notes assembled into a stack and having color or grayscale values corresponding with pieces of the image. The notes are arranged in a particular order in the stack such that, when the notes are removed from the stack and placed on a surface in the particular order, the notes recreate a version of the image.

DETAILED DESCRIPTION

To make the process of creating murals simpler, software can be used to transform an image into a large pixelated version of the image, where each pixel represents, for example, a 3"×3" repositionable note. Different designs can be printed on every note within a pad of notes. This process can also be used without pixelating the image. In particular, an image can be divided into smaller square pieces, and each piece can be printed on a repositionable note and made into a pad of notes. The image can then be recreated by a user systematically placing the notes from the pad of notes on a surface in a particular order or arrangement.

The process receives an image, divides it apart into pieces, and prints each piece of the image on an adhesive-coated repositionable note. Examples of such repositionable notes include POST-IT notes from 3M Company. The printed notes are then organized into a stack or pad of notes in an organized manner that allows a user to recreate the original image by sticking each note onto a surface side by side, going through the pad of printed notes from top to bottom, for example. This method provides a systematic way of recreating an image using printed repositionable notes that are arranged in a specific way in a pad of notes.

Instead of printing pieces of the image on repositionable notes, the method can select notes having color or grayscale values corresponding with the pieces of the image and stack them in a pad of notes in a particular order. When arranged on a surface in a specific way, these notes can be used to create a version or resemblance of the image.

Figure 1:
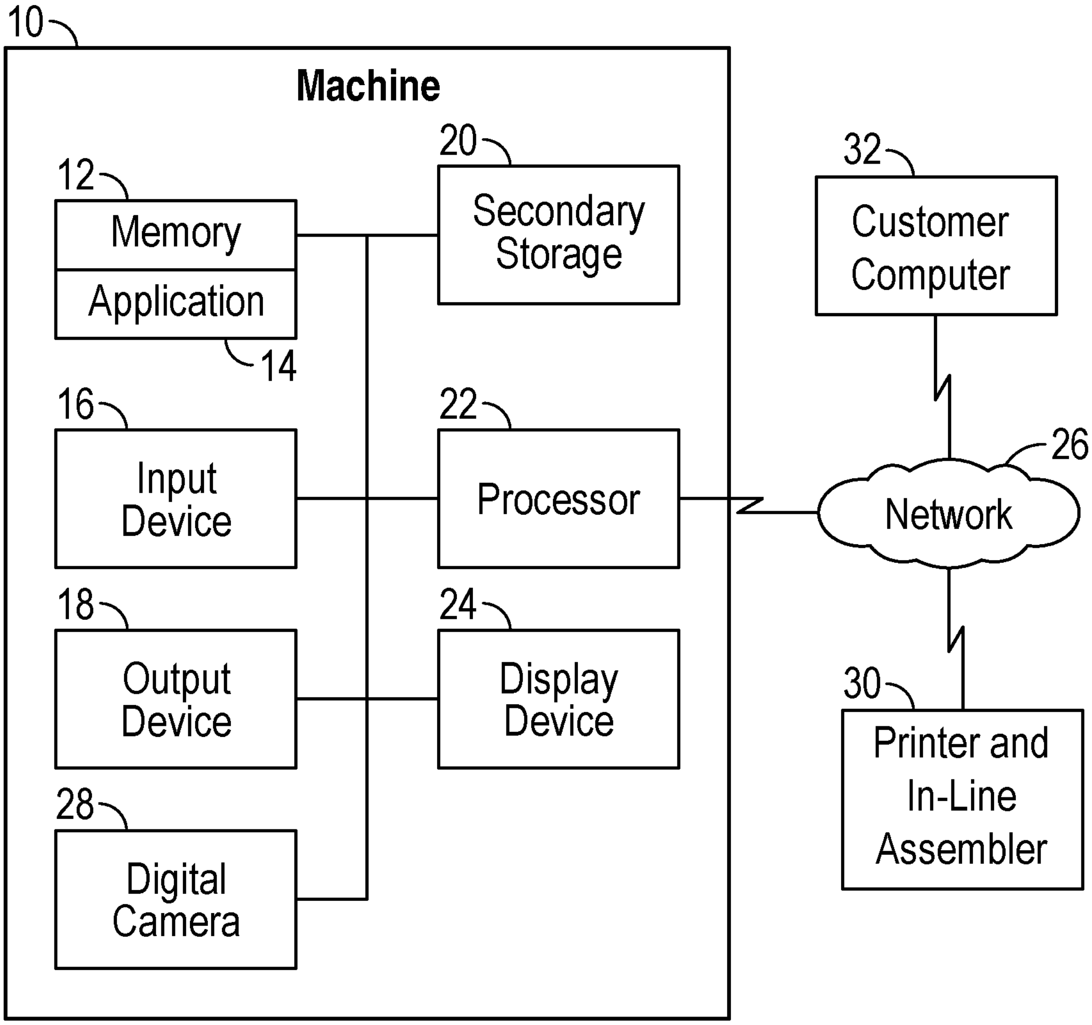
FIG. 1 is a diagram of an exemplary computer system for generating a repositionable notes mural pad.

FIG. 1 is a diagram of an exemplary machine 10 for generating a repositionable notes mural pad. Machine 10 can include, for example, the following components: a memory 12 storing one or more applications 14: a secondary storage 20 for providing non-volatile storage of information: an input device 16 for entering information or commands into machine 10: a processor 22 for executing applications stored in memory 12 or secondary storage 20, or as received from another source: an output device 18 for outputting information, such as a printer for providing hard copies of information in printed form or speakers for providing information in audio form: a display device 24 for electronically displaying information in visual or audiovisual form: and a digital camera 28 or other image capture device for capturing digital images. Machine 10 can include a connection to a network 26 such as the Internet, an intranet, or other type of network. Machine 10 includes a connection via network 26 to a printer and in-line assembler 30 for use in printing pieces or portions of an image onto repositionable notes, using for example an inkjet printer, and assembling the printed notes in-line with the printer into a stack of notes secured to one another via the adhesive coating on the notes. The term "stack of notes" also includes a pad of notes and notes pad. The system can also include a connection via network 26 to a customer computer 32.

Figure 2:
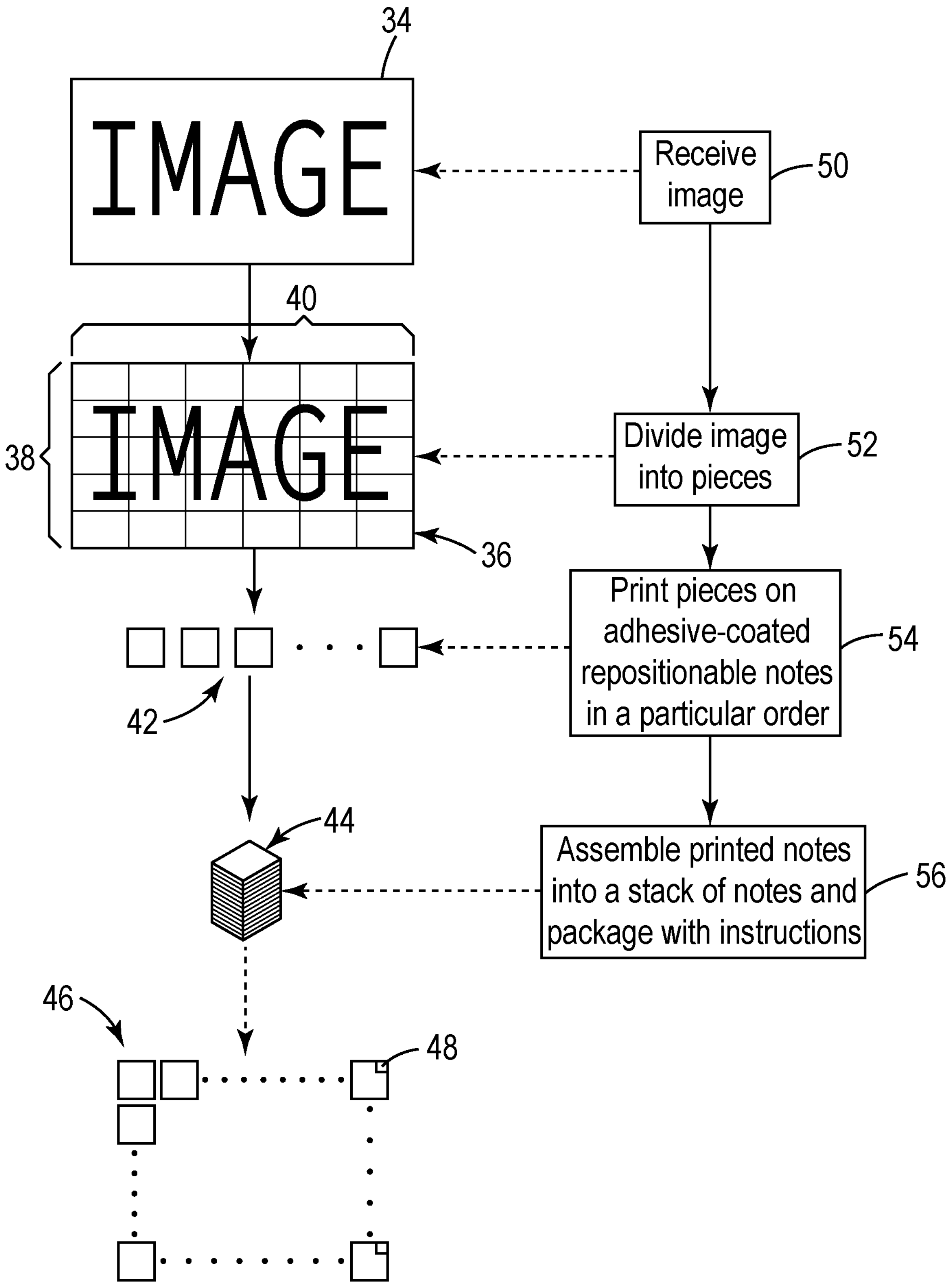
FIG. 2 is a flow chart of a process to make a repositionable notes mural pad by dividing an image into pieces for notes.

FIG. 2 is a flow chart of a process to make a repositionable notes mural pad by dividing an image into pieces for notes. This process can be implemented in software or firmware, for example application 14, for execution by a processor such as processor 22.

The process receives an image 34 (step 50), represented by the word IMAGE, and divides the image into pieces or pixels 36 (step 52). The image can be, for example, a photograph in a PDF (Portable Document Format) or JPG (Joint Photographic Experts Group) format. In this case, the image is electronically divided into rows 38 and columns 40, where each row and column position represented a piece of image 34.

The pieces of the image are printed on adhesive-coated repositionable notes in a particular order (step 54), as represented by notes 42. For instance, the pieces of the image are arranged in a set of PDF documents, in the particular order, and are sent in that order to printer and in-line assembler 30, which prints the pieces on the notes. Alternatively, the pieces can be printed on the notes without the adhesive, and the printed notes can then be coated with the adhesive to make repositionable notes. Printer and in-line assembler 30 can be located locally with machine 10 to print and assemble the notes or remote from machine 10 and accessed via network 26. For example, the PDF documents with pieces of an original image can be sent to another entity, such as a print house, for printing and assembling the stack of notes.

Depending upon the number and size of the notes, the pieces of the image can be expanded or reduced in the PDF documents in relation to the corresponding piece in the original image. For example, if the original image is 8"×10" and the corresponding image made from the notes is 5 rows and 6 columns of 3"×3" notes, then the original image can be expanded to approximately 15"×18" to essentially cover all or most of the notes. Conversely and as another example, if the original image is 8"×10" and the corresponding image made from the notes is 5 rows and 6 columns of 1.5"×1.5" notes, then the original image can be reduced to approximately 7.5"×9" to essentially cover all or most of the notes.

Typically, all repositionable notes in the same stack or pad have a same size designation, for example 3"×3" notes, for use in recreating an original image. Alternatively, the process of FIG. 2 could use different size notes, for example square notes with rectangular notes the width of two or more square notes, possibly prepared in different stacks with corresponding instructions for placement together to recreate the original image.

The process assembles the printed notes into a stack of notes 44, using printer and in-line assembler 30, and packages the stack of notes with instructions indicating how to recreate image 34 with the notes (step 56). For example, stack of notes 44 can be packaged in a plastic wrapping with a card having the printed instructions for use in recreating the original image from notes 44.

Based upon the instructions, a user can remove the notes from the stack of notes 44 and position them in the particular order to recreate the image, as represented by collection of notes 46. Notes 46 would include the printed pieces of image 34 to collectively recreate the image. Only a few notes are shown in collection of notes 46 for illustrative purposes: the collection of notes 46 would include notes to fill in the 5 rows and 6 columns for this example. The notes can be repositionably adhered, for example, on a wall or other surface. If the notes are arranged left to right in rows from top row to bottom row, then the last note in each row can optionally include an indicator 48 so that a user knows when to start the next row. The indicator can be, for example, a symbol, an icon, or company or entity logo. Alternatively, only the last note in the first row, and possibly other selected rows, can include indicator 48.

Figure 3:
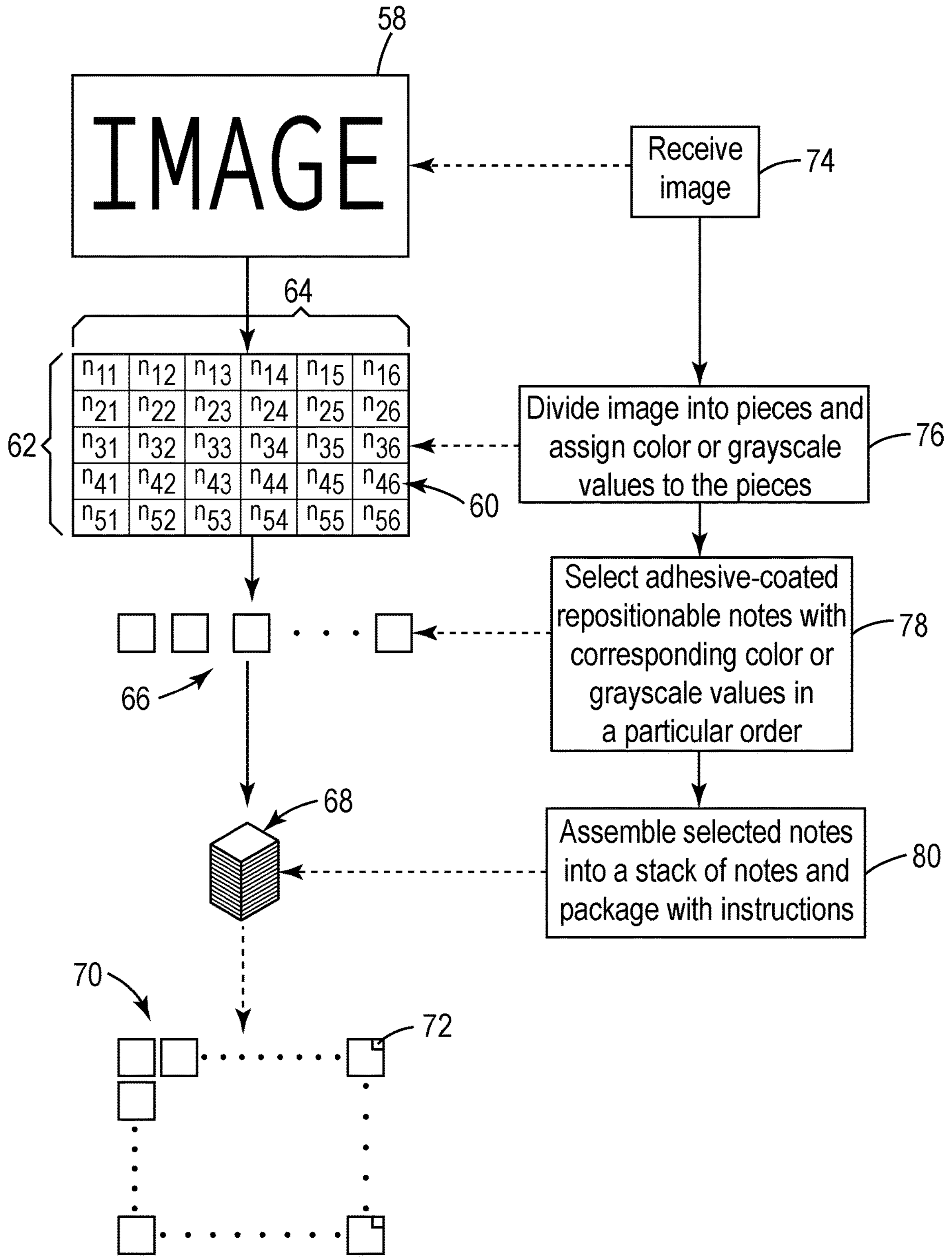
FIG. 3 is a flow chart of a process to make a repositionable notes mural pad by assigning color or grayscale values to pieces of the image.

FIG. 3 is a flow chart of a process to make a repositionable notes mural pad by assigning colors or grayscale values to pieces of the image. This process can be implemented in software or firmware, for example application 14, for execution by a processor such as processor 22.

The process receives an image 58 (step 74), represented by the word IMAGE. The image can be, for example, a photograph in PDF or JPG format. In this case, the image is electronically divided into rows 62 and columns 64, where each row and column position represented a piece of image 58. The process divides the image into pieces or pixels 60 and assigns color or grayscale values to the pieces (step 76) based upon the image. Each piece represents a particular note position ($n_{row,column}$) to later recreate a version of the image. The color or grayscale values can represent, for example, the average color or grayscale value for the corresponding piece of the image such that, when viewed from a particular distance, the color or grayscale value notes appear to blend together to recreate a version or resemblance of the original image but possibly with less detail depending upon a size of the notes. Table 1 provides an exemplary data structure to store color values and grayscale values for the note positions of the image pieces.

TABLE 1

| Image Piece | Color Value | Grayscale Value |
|---|---|---|
| $n_{11}$ | color $value_{11}$ | grayscale $value_{11}$ |
| $n_{12}$ | color $value_{12}$ | grayscale $value_{12}$ |
| $n_{13}$ | color $value_{13}$ | grayscale $value_{13}$ |
| . . . | . . . | . . . |
| $n_{56}$ | color $value_{56}$ | grayscale $value_{56}$ |

Adhesive-coated repositionable notes with corresponding color or grayscale values are selected in a particular order (step 78), as represented by notes 66. Alternatively, colors having the color values or shades of gray having the grayscale values can be printed on blank notes in the particular order using printer and in-line assembler 30. The process assembles the selected notes (or printed notes) into a stack of notes 68, using printer and in-line assembler 30, and packages the stack of notes with instructions indicating how to recreate a version of image 58 with the notes (step 80). For example, stack of notes 68 can be packaged in a plastic wrapping with a card having the printed instructions for use in recreating a version of the original image from notes 68.

Based upon the instructions, a user can remove the notes from the stack of notes 68 and position them in the particular order to recreate the image, as represented by collection of notes 70. Notes 70 would include the color or grayscale values to collectively recreate a version of the image. Only a few notes are shown in collection of notes 70 for illustrative purposes; the collection of notes 70 would include notes to fill in the 5 rows and 6 columns for this example. The notes can be placed, for example, on a wall or other surface. If the notes are arranged left to right in rows from top row to bottom row, then the last note in each row can optionally include an indicator 72 so that a user knows when to start the next row. The indicator can be, for example, a symbol, an icon, or company or entity logo. Alternatively, only the last note in the first row, and possibly other selected rows, can include indicator 72.

Figure 4:
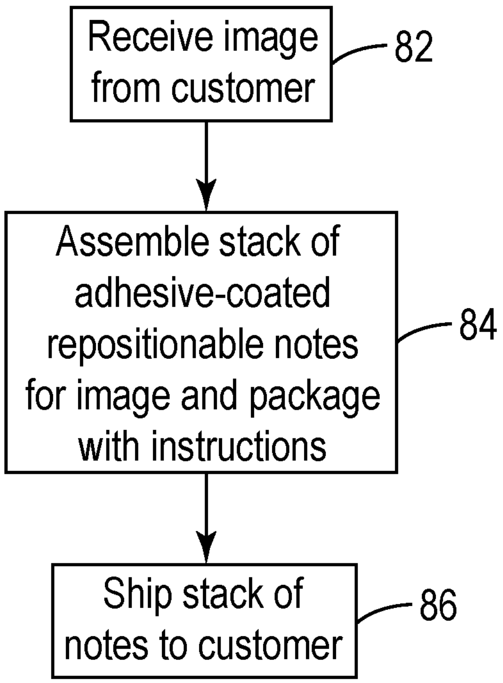
FIG. 4 is flow chart of a process for providing to a customer a repositionable notes mural pad.

FIG. 4 is flow chart of a process for providing to a customer a repositionable notes mural pad. This process can be implemented in software or firmware, for example application 14, for execution by a processor such as processor 22. The process receives an image from a customer (step 82), for example from customer computer 32 transmitted via network 26 to machine 10 as an email or other electronic communication. Customer computer 32 can have, for example, the same or similar components as machine 10. The customer can, for example, take a photo using a digital camera and send the photo as the image, or scan a printed photo and send the scan as the image. Table 2 provides an example of an order form for a customer to submit a request for a mural stack or pad of notes, possibly with payment.

TABLE 2

| |
|---|
| customer name |
| customer address |
| type of mural requested |
| (printed image, or color or grayscale values) |
| preferred size of notes |
| attach image |

The process assembles a stack of adhesive-coated repositionable notes for the image and packages the stack of note with instructions, using the processes of FIG. 2 or 3. The stack of notes is sent or shipped to the customer (step 86).

The invention claimed is:

1. A method for assembling a stack of notes for use in recreating an image, comprising:

receiving an image;

dividing the image into pieces;

printing the pieces on adhesive-coated repositionable notes in a particular order; and assembling the printed notes into a stack of notes in the particular order.

2. The method of claim 1, wherein the notes have a same size designation.

3. The method of claim 1, further comprising expanding the image before the dividing.

4. The method of claim 1, further comprising reducing the image before the dividing.

5. The method of claim 1, further comprising generating a plurality of documents for the pieces, wherein the documents are arranged in the particular order.

6. The method of claim 5, further comprising sending the documents to a remote printer and in-line assembler for the printing and assembling.

7. The method of claim 1, further comprising packaging the stack of notes with instructions for use in recreating the image from the notes.

8. The method of claim 1, wherein the particular order comprises left to right in rows from top row to bottom row.

9. The method of claim 1, further comprising:

receiving an image from a customer;

assembling a stack of adhesive-coated repositionable notes for the image using the method of claim 1; and sending the stack of notes to the customer.

10. The method of claim 9, further comprising packaging the stack of notes with instructions for use in recreating the image from the notes.

11. A method for assembling a stack of notes for use in recreating an image, comprising:

receiving an image;

dividing the image into pieces;

assigning color or grayscale values to the pieces based upon the image;

selecting adhesive-coated repositionable notes with the assigned color or grayscale values in a particular order; and assembling the selected notes into a stack of notes in the particular order.

12. The method of claim 11, wherein the notes have a same size designation.

13. The method of claim 11, further comprising packaging the stack of notes with instructions for use in recreating the image from the notes.

14. The method of claim 11, wherein the particular order comprises left to right in rows from top row to bottom row.

* * * * *